(12) United States Patent
Ohkado et al.

(10) Patent No.: US 6,912,573 B2
(45) Date of Patent: Jun. 28, 2005

(54) METHOD FOR ACQUIRING CONTENT INFORMATION, AND SOFTWARE PRODUCT, COLLABORATION SYSTEM AND COLLABORATION SERVER FOR ACQUIRING CONTENT INFORMATION

(75) Inventors: Akira Ohkado, Yokohama (JP); Yoichi Yoshida, Machida (JP); Mitsugu Kanetake, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 09/784,697

(22) Filed: Feb. 15, 2001

(65) Prior Publication Data

US 2001/0016873 A1 Aug. 23, 2001

(30) Foreign Application Priority Data

Feb. 15, 2000 (JP) ........................................ 2000-036314

(51) Int. Cl.[7] ........................ G06F 15/173; G06F 15/16
(52) U.S. Cl. ........................ 709/224; 709/219; 709/217
(58) Field of Search ................................ 709/204–206, 709/217, 219, 223, 224

(56) References Cited

U.S. PATENT DOCUMENTS

| | | | | |
|---|---|---|---|---|
| 6,055,551 A | * | 4/2000 | Heinlein et al. | 715/530 |
| 6,065,051 A | * | 5/2000 | Steele et al. | 709/219 |
| 6,108,687 A | | 8/2000 | Craig | |
| 6,240,444 B1 | * | 5/2001 | Fin et al. | 709/205 |
| 6,295,551 B1 | * | 9/2001 | Roberts et al. | 709/205 |
| 6,507,865 B1 | * | 1/2003 | Hanson et al. | 709/206 |
| 6,625,624 B1 | * | 9/2003 | Chen et al. | 707/204 |
| 6,640,241 B1 | * | 10/2003 | Ozzie et al. | 709/204 |

FOREIGN PATENT DOCUMENTS

| | | | |
|---|---|---|---|
| EP | 0820028 | 7/1997 | ........... G06F/17/60 |
| EP | 0908824 | 10/1998 | ........... G06F/11/34 |
| EP | 9914926 | 3/1999 | ........... H04M/3/50 |
| EP | 0908824 | 4/1999 | ........... G06F/11/34 |
| EP | 1130511 | 1/2001 | ........... G06F/9/46 |
| JP | 124461 | 5/1998 | ........... G06F/15/00 |
| JP | 116238 | 6/1998 | ........... G06F/13/00 |
| JP | 249995 | 9/1999 | ........... G06F/13/00 |
| JP | 035951 | 2/2000 | ........... G06F/15/00 |
| WO | 9844695 | 10/1998 | ........... H04L/29/06 |

* cited by examiner

Primary Examiner—Ario Etienne
Assistant Examiner—Hussein A El-chanti
(74) Attorney, Agent, or Firm—A. Bruce Clay; Yee & Associates, P.C.

(57) ABSTRACT

A customer browser and an agent browser are connected to each other through a collaboration server, and a Web server is controlled so as to be accessed through the collaboration server. When the browsers and refer to a page, the collaboration server embeds an applet for detecting a change in the page and a client controller for displaying a page corresponding to changed page information of the other party which performs collaboration. When the customer and agent browsers detect the change in the page, the applet is invoked, and the changed page information is sent to the other party via the collaboration server, and the client controller on the other party controls the browser so as to display the changed page.

6 Claims, 14 Drawing Sheets

FIG. 7

SESSION MANAGEMENT TABLE *210*

| SESSION ID *211* | SESSION STATE *213* | UAI 1 *215* | SOCKET 1 *217* | UAI 2 *219* | SOCKET 2 *221* |
|---|---|---|---|---|---|
| 1 | BEING USED | A123456789 | 00000011 | 000012345 | 00000012 |
| 2 | NOT USED | | | | |
| 3 | NOT USED | | | | |

FIG. 8

AGENT MANAGEMENT TABLE *230*

| AGENT ID *231* | QUEUE NAME *233* | STATE *235* | UAI *237* |
|---|---|---|---|
| AGENT 01 | | UNDER LOG-OFF | |
| AGENT 02 | PC | UNDER LOG-OFF | A123456789 |
| | | | |

FIG. 9

ENTRY OF CUSTOMER QUEUE *250*

| CUSTOMER ID *251* | QUEUE NAME *253* | UAI *255* |
|---|---|---|
| 000000001 | PC | 000012345 |

FIG. 10

CACHE MANAGEMENT TABLE 270

| UAI 1 271 | UAI 2 273 |
|---|---|
| A123456789 | 000012345 |
|  |  |

FIG. 11

UAI-SOCKET MANAGEMENT TABLE 280

| UAI 281 | SOCKET 283 |
|---|---|
| A123456789 | 000000022 |
|  |  |

FIG. 12

─IN THE CASE WHERE NO FRAME EXISTS─

PARTIAL TREE STRUCTURE ACQUIRED abc/index.htm abc/index.htm

FIG. 13

─IN THE CASE WHERE FRAME EXISTS─

PARTIAL TREE STRUCTURE ACQUIRED abc/index.htm
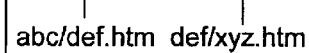
abc/def.htm   def/xyz.htm SCRIPT OF abc/def.htm
abc/def.htm
PARENT = abc/index.htm
THE NUMBER OF
 CHILDREN=2
POSITION OF LOCAL DEVICE=1

SCRIPT OF def/xyz.htm
def/xyz.htm
PARENT = abc/index.htm
THE NUMBER OF
 CHILDREN=2
POSITION OF LOCAL DEVICE=2

METHOD FOR ACQUIRING CONTENT INFORMATION, AND SOFTWARE PRODUCT, COLLABORATION SYSTEM AND COLLABORATION SERVER FOR ACQUIRING CONTENT INFORMATION

FIELD OF THE INVENTION

The present invention relates to an information processing method, more particularly to a method for allowing browsers of two or more remote information terminals to be synchronized with each other.

BACKGROUND OF THE INVENTION

Techniques for allowing two remote browsers with one as an agent and the other as a customer to be synchronized with each other have been used in products such as Corepoint Web Collaboration a (trademark registered by IBM Corp.) However, in such technologies, special application software must be installed in each of the remote information terminals.

U.S. Pat. No. 5,944,791 patented for Contigo Co. Ltd. discloses a scheme which causes a server to rewrite a link and controls a load by using a JAVA applet. However, only the link can be synchronized, and changes of the URL originated from an internal control by a JAVA applet cannot be detected, thus disabling synchronization.

SUMMARY OF THE INVENTION

The object of the present invention is to provide a collaboration system which allows a plurality of remote information terminals to construct a collaboration system there between, without requiring installation of special software beforehand.

Another object of the present invention is to provide a collaboration system capable of reliably transmitting a transition of a Web browser from one information terminal to other information terminals participating in the collaboration, regardless of events occurring in the information terminals.

Still another object of the present invention is to provide a low cost collaboration system which requires fewer resources in carrying out collaboration.

A still further object of the present invention is to provide a collaboration system capable of instantly reflecting a change in software for offering collaboration thereon.

A still further object of the present invention is to provide a collaboration system which does not depend on the platform of an information terminal to be operated.

In one aspect of the present invention, a browser installed in a customer information terminal and a browser installed in agent information terminals are interconnected to each other through a collaboration server and are controlled so that a Web server is accessed through the collaboration server. When the customer browser or the agent browser refers to a page of the Web server, the collaboration server embeds therein an applet for detecting a change in a page and notifying the collaboration server of changed page information, and a client controller for displaying a page corresponding to the changed page information of the other party with which a collaboration is executed, the changed page information being transmitted from the collaboration server. When the change in the page is detected either in the customer browser or in the agent browser, the applet is activated, the changed page information is sent to an applet of the other party with which the collaboration is executed via the collaboration server. A client controller of the other party controls a browser so as to display the changed page.

According to one aspect of this invention, there is provided a content information acquisition method for allowing an agent information terminal to acquire information same as content information acquired from a Web server by a customer information terminal having a customer browser installed therein which displays the content information, comprising the steps of:

(a) interconnecting the agent information terminal with a collaboration server for communication;

(b) generating a user access identifier for identifying the agent information terminal uniquely;

(c) acquiring from the collaboration server an agent applet for generating an agent control window through which personal information is input and which transmits the personal information from the agent information terminal to the collaboration server;

(d) activating the agent applet to generate the agent control window;

(e) transmitting a log-on request including a user ID of an agent from the agent information terminal to the collaboration server in response to a log-on instruction operation by the agent;

(f) interconnecting the customer information terminal with the collaboration server;

(g) generating another user access identifier for uniquely identifying the customer information terminal;

(h) acquiring from the collaboration server a first customer applet for generating a customer control window through which personal information is input and which transmits the personal information from the customer information terminal to the collaboration server;

(i) activating the first customer applet to generate the customer control window;

(j) transmitting a log-on request including personal information of the customer and query type information from the customer information terminal to the collaboration server in response to a log-on instruction operation by the customer;

(k) adding a record of the customer to a customer queue corresponding to the query type information;

(l) checking a waiting state of the record of the customer in the customer queue corresponding to the query type information;

(m) informing the customer information terminal of a checking result;

(n) assigning an agent corresponding to the query type information to the customer;

(o) informing the agent information terminal of a start of a session;

(p) informing the customer information terminal of the start of the session;

(q) embedding in the content information a second customer applet for checking a change in the content information displayed by the customer browser, the second customer applet being embedded by the collaboration server when the customer information terminal acquires the content information from the Web server via the collaboration server;

(r) embedding a customer side script for acquiring changed page information including a URL of a page including the changed content information, a URL of a parent page of the page including changed content information, a number of child pages of the parent page and a position of the page including the changed content information for the parent page;

(s) transmitting the changed page information to the collaboration server, checking whether or not the changed page information transmitted corresponds to a page that is currently displayed by the customer browser in response to acquisition of the changed page information transmitted from the agent, and embedding a tree manager for instructing the customer browser to display a page corresponding to the changed page information transmitted when the changed page information from the agent does not correspond to the currently displayed page;

(t) transmitting the changed page information to the collaboration server in response to detection by the second customer applet of the content information displayed by the customer browser;

(u) transmitting the changed page information to the agent information terminal by the collaboration server;

(v) causing the agent information terminal to determine whether or not a page that is currently displayed by an agent browser corresponds to the changed page information; and (w) loading a page corresponding to the changed page information on the agent browser when the agent browser has decided that the currently displayed page does not correspond to the changed page information.

In claims and the specification of this application, "browser" is a concept including a Web browser such as Netscape Communicator (trademark of Netscape Communications Corp.) and Internet Explorer (trademark of Microsoft Corp.), and Viewer such as Acrobat Reader (trademark of Adobe Systems, Inc.). "Web server" is a concept including World Wide Web server (WWW server) which provides a browser with content information through the Internet, and a server which is connected to a local network to provide a browser with content information. "Agent applet" is a concept including "applet A" illustrated in a later section of embodiments. "First customer applet" is a concept including "applet C" shown in the later section of the embodiments. "Second customer applet" is a concept including "applet P" shown in the later section of the embodiments. Furthermore, a step (q) for embedding a second customer applet, a step (r) for embedding a customer side script, and a step (s) for embedding a tree manager may be executed in any order individually, or in any combination simultaneously.

According to another aspect of this invention, there is provided a content information acquisition method for allowing a second information terminal to acquire information same as content information acquired from a Web server by a first information terminal having a customer browser installed therein which displays the content information, comprising the steps of:

(a) interconnecting the first information terminal with a collaboration server for communication;

(b) interconnecting the second information terminal with the collaboration server for communication;

(c) embedding a client controller for transmitting changed content specifying information to the collaboration server when the first information terminal acquires new content information from the Web server via the collaboration server;

(d) transmitting the changed content specifying information to the collaboration server when the first information terminal acquires the new content information from the Web server via the collaboration server;

(e) causing the collaboration server to transmit the changed content specifying information to the second information terminal; and (f) causing the second information terminal to acquire the changed content specifying information.

In the claims and the specification of this application, "client controller" is a concept including "tree manager" described in the later section of the embodiments, and detection and comparison functions of tree structures are not essential for the client controller as in a case where a frame is not supported. The client controller just needs a function to instruct the browser to acquire the content information.

According to a further aspect of this invention, there is provided a content information acquisition method for allowing a second information terminal to acquire information same as content information acquired from a Web server by a first information terminal having a customer browser installed therein which displays the content information, comprising the steps of:

(a) embedding a client controller for transmitting changed content specifying information to a collaboration server and transmitting the client controller to the first information terminal, when the first information terminal connected to the collaboration server acquires new content information via the collaboration server;

(b) causing the collaboration server to receive the changed content specifying information transmitted by the client controller of the first information terminal; and (c) transmitting the changed content specifying information to the second information terminal in order to enable the second information terminal connected to the collaboration server to acquire the changed content specifying information.

According to a yet further aspect of this invention, there is provided a software product for supporting a second information terminal in acquiring information same as content information acquired by a first information terminal from a Web server, the first information terminal having a first browser installed therein which displays the content information, the software product comprising:

(a) program code for instructing a collaboration server to embed a client controller which transmits changed content specifying information to the collaboration server, when the first information terminal connected to the collaboration server acquires new content information from the Web server via the collaboration server; and (b) program code for instructing the collaboration server to transfer the changed content specifying information to the second information terminal, the changed content specifying information being transmitted from the first information terminal.

In the claims and the specification of this application, "software product" is a concept including software (concept including a program) stored in a storage medium, and also software itself.

According to a still further aspect of this invention, there is provided a software product for supporting an agent information terminal in acquiring information same as content information acquired by a customer information terminal from a Web server, the customer information terminal having a customer browser installed therein which displays the content information, the software product comprising:

(a) program code for instructing a collaboration server to generate a user access identifier which uniquely identifies an agent information terminal interconnected to the collaboration server;

(b) in the agent information terminal, an agent applet for generating an agent control window through which personal information is input and which transmits the personal information from the agent information terminal to the collaboration server, and transmits a log-on request including a user ID of an agent from the agent information terminal to the collaboration server, in response to a log-on instruction operation by the agent;

(c) a program code for instructing the collaboration server to generate a user access identifier which uniquely identifies a customer information terminal interconnected to the collaboration server;

(d) in the customer information terminal, a first customer applet for generating a customer control window through which personal information is input and which transmits the personal information from the customer information terminal to the collaboration server, and transmits a log-on request including the personal information of a customer and query type information from the customer information terminal to the collaboration server, in response to a log-on instruction operation by the customer;

(e) a program code for instructing the collaboration server to assign an agent corresponding to the query type information to the customer;

(f) a program code for instructing the collaboration server to notify the agent information terminal of a start of a session;

(g) a program code for instructing the collaboration server to notify the customer information terminal of the start of the session;

(h) a program code for instructing the collaboration server to embed, in content information, a second customer applet for detecting a change in content information displayed by the customer browser when the customer information terminal acquires the content information from the Web server via the collaboration server;

(i) a program code for instructing the collaboration server to embed a customer side script for acquiring changed page information including a URL of a page including the change in content information, a URL of a parent page of the page including the change in content information, a number of child pages of the parent page and a position of the page including the change in content information relative to the parent page;

(j) a program code for instructing the collaboration server to embed a tree manager which transmits the change in page information to the collaboration server, checks whether or not the change in page information transmitted from the agent corresponds to a page that is currently displayed by the customer browser in response to acquisition of the change in page information transmitted from the agent and instructs the customer browser to display a page corresponding to the change in page information transmitted from the agent when the change in page information transmitted does not correspond to the currently displayed page; and (k) a program code for instructing the collaboration server to transmit the change in page information transmitted from the customer information terminal to the agent information terminal, in response to detection by the second customer applet of a change in content information displayed by the customer browser.

According to a yet still further aspect of this invention, there is provided a collaboration system which supports an agent information terminal in acquiring information same as content information acquired from a Web server by a customer information terminal which has a customer browser installed therein which displays the content information, comprising:

(a) a customer information terminal having a customer browser installed therein;

(b) an agent information terminal having an agent browser installed therein;

(c) an HTTP bridge for supporting an interconnection between the agent information terminal and the customer information terminal;

(d) means for generating a user access identifier which uniquely identifies the agent browser and the customer browser;

(e) an agent applet for generating an agent control window through which personal information is input and which transmits the personal information from the agent information terminal to a collaboration server, and transmitting a log-on request including a user ID of an agent from the agent information terminal to the collaboration server, in response to a log-on instruction operation of an agent;

(f) a first customer applet for generating a customer control window through which personal information is input and which transmits the personal information from the customer information terminal to the collaboration server, and transmitting a log-on request including the personal information of a customer and query type information from the customer information terminal to the collaboration server, in response to a log-on instruction operation by the customer;

(g) a call manager for assigning an agent corresponding to the query type information to the customer;

(h) a cache manager for embedding into the content information when the customer information terminal acquires the content information from the Web server via the collaboration server: (1) a second customer applet which detects a change in content information displayed by the customer browser; (2) a customer side script which acquires changed page information including a URL of a page including the changed content information, a URL of a parent page of the page including the changed content information, the number of child pages of the parent page and a position of the page including the changed content information relative to the parent page; and (3) a tree manager which transmits the changed page information to the collaboration server, checks whether or not the changed page information transmitted from the agent corresponds to a page that is currently displayed by the customer browser in response to acquisition of the changed page information transmitted from the agent, and instructs the customer browser to display a page corresponding to the changed page information transmitted from the agent; and (i) a session manager for recording a combination of user access identifiers of the agent and the customer, both of which perform a collaboration, and transmit the changed page information transmitted from the customer information terminal to the agent information terminal, in response to detection by the second customer applet of the content information displayed by the customer browser.

According to a yet still further aspect of this invention, there is provided a collaboration system which supports a second information terminal in acquiring information same as content information acquired from a Web server by a first information terminal having a first browser installed therein which displays the content information, comprising:

(a) a cache manager for embedding a client controller which transmits changed content specifying information to a collaboration server, when the first information terminal connected to the collaboration server acquires new content information from the Web server via the collaboration server; and (b) a session manager for transmitting the changed content specifying information transmitted from the first information terminal to the second information terminal when the client controller detects a change in the content information being displayed by the first browser.

BRIEF DESCRIPTION OF THE DRAWINGS

For a more complete understanding of the present invention and the advantages thereof, reference is now made to the following description taken in conjunction with the accompanying drawings, in which:

FIG. 3 is a function block diagram showing the system structure of the collaboration system in an embodiment of the present invention, which includes processing elements that operate when an agent performs log-on;

FIG. 7 is a conception view of a session management table in an embodiment of the present invention;

FIG. 8 is a conception view of an agent management table in an embodiment of the present invention;

FIG. 9 is a conceptual view of a customer queue in an embodiment of the present invention;

FIG. 10 is a conceptual view of a cache management table in an embodiment of the present invention;

FIG. 11 is a conceptual view of a UAI-socket management table in an embodiment of the present invention;

FIG. 12 is a conceptual view for explaining a partial tree structure in an embodiment of the present invention;

FIG. 13 is a conceptual view for explaining steps for generating the partial tree structure in an embodiment of the present invention;

DETAILED DESCRIPTION OF THE PREFERRED EMBODIMENTS

A. Summary

Figure 1:
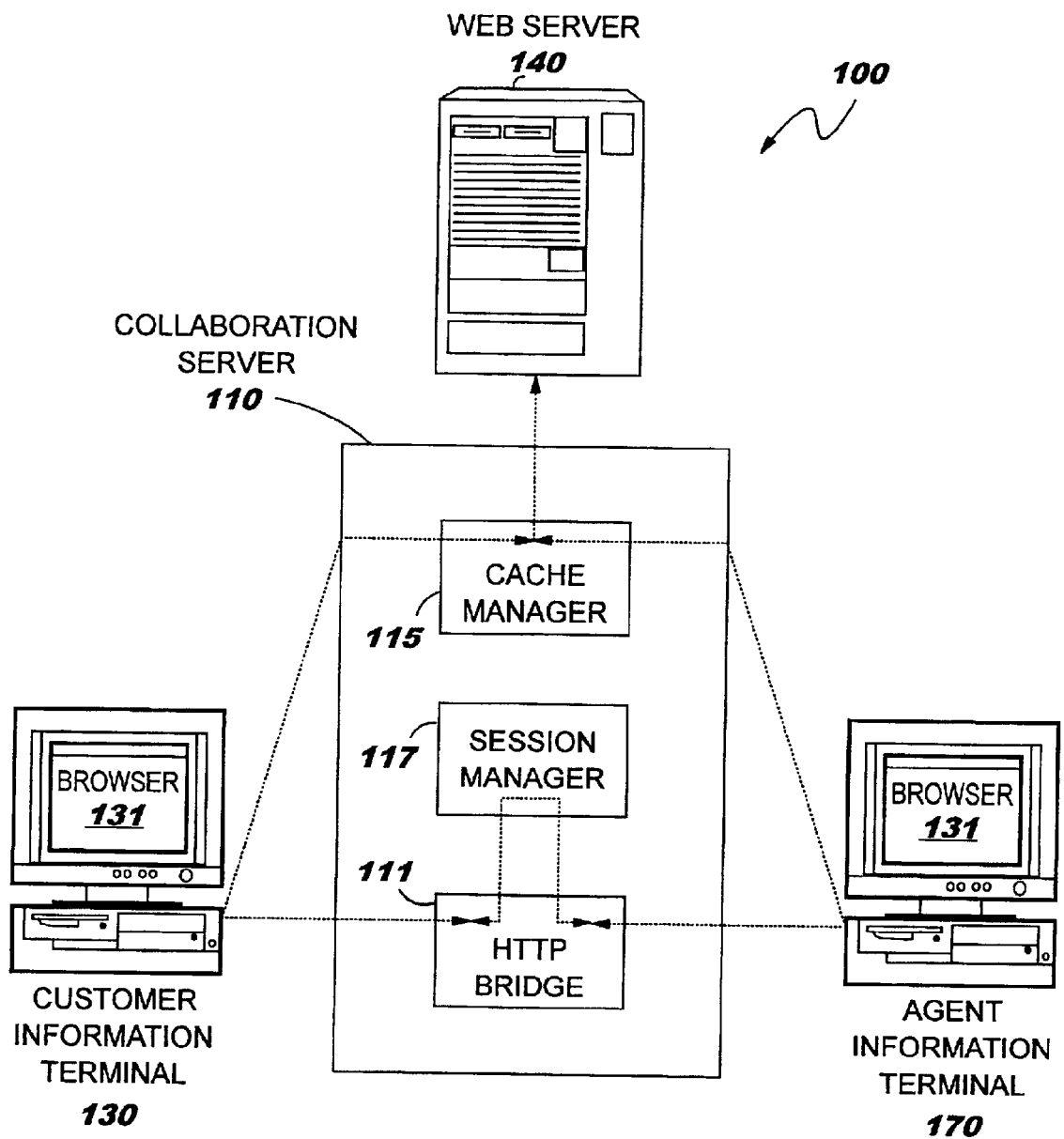
FIG. 1 is a schematic view of a collaboration system in a preferred embodiment of the present invention.

FIG. 1 presents a schematic view showing a collaboration system 100 according to a preferred embodiment of the present invention. As shown in FIG. 1, a customer accesses a Web server 140 through a collaboration server 110. The collaboration server 110 assigns an ID (user access identifier: UAI) for uniquely specifying the browser of the customer, and establishes a collaboration session by means of a combination of the ID. At this time, an agent who responds to the customer is assigned to the customer. Thus, the collaboration session between the agent and the customer is established.

The collaboration server 110 modifies an html including a BODY tag to embed an applet and a script for detecting the structure of the html and its change. As the result of this alteration, the function of JavaScript is called when the html loading is completed. The function of the JavaScript acquires URL from a present window to the topmost window and number information of the windows at respective nodes.

Each of the JavaScripts invoked on the agent and customer sides acquires its own information such as its own URL and a position relative to the parent, and parent's information such as parent's URL and the number of parent's children. Each of the JavaScripts passes the information to an applet inserted into the html. The applet passes the information to a tree management class which manages the structure of the html that is currently displayed. The tree management class is executed within a Java Virtual Machine (JVM) as a thread which has no graphical user interface (GUI), and one instance of the tree management class is commonly called by the applets of all html within one top level window.

In the tree management class, a tree structure is transmitted to the other side of the collaboration every time an alteration occurs in the tree. Also the class that handles the communication is executed as a thread having no GUI. When the tree management class receives tree information, the tree management class compares the received tree information with the local tree. If there is a difference between them, and if the local side is not the initiator of the transition, loading is initiated to correct the difference.

B. Structure of hardware

Figure 2:
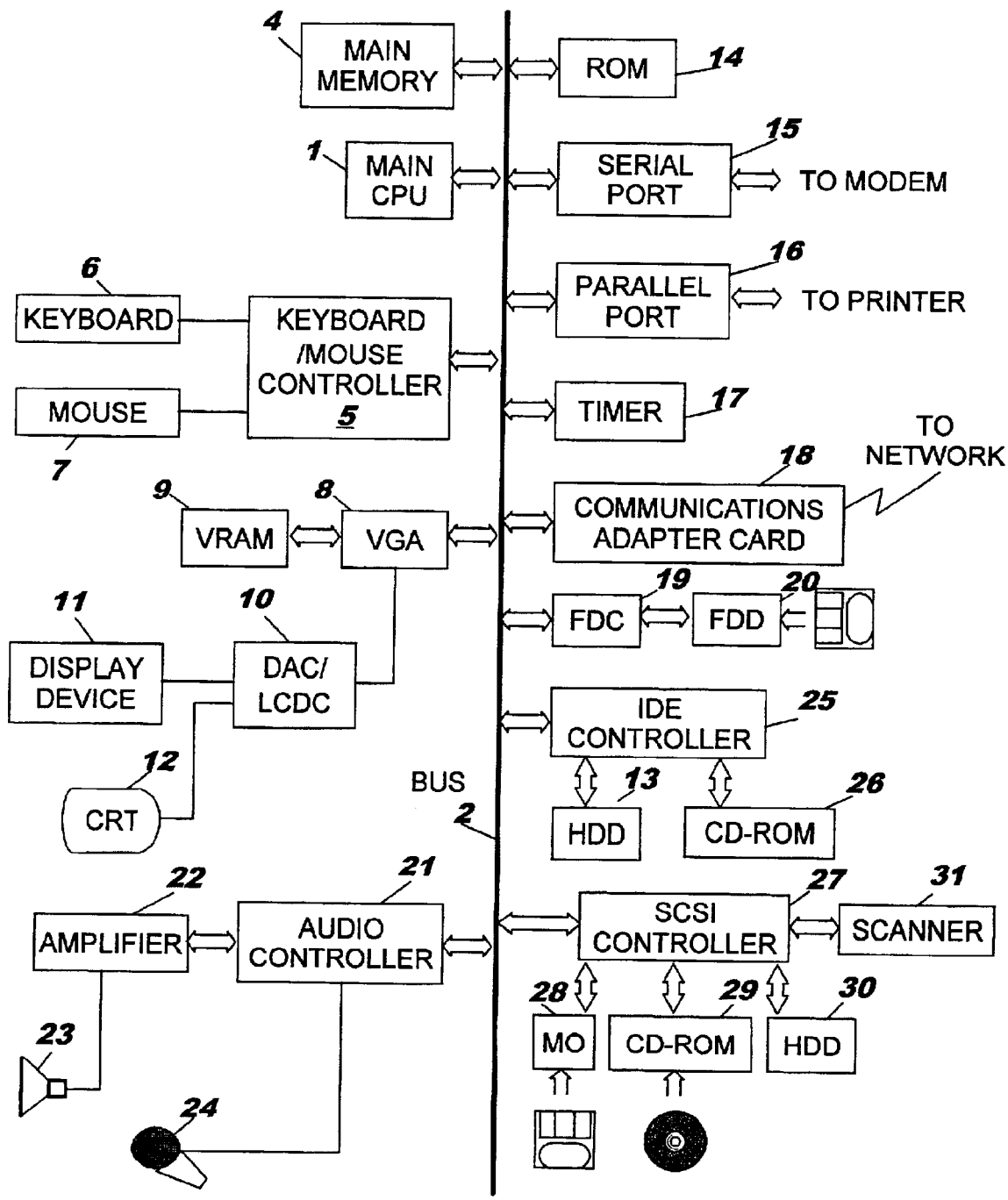
FIG. 2 is a block diagram showing one embodiment of the hardware structure of a collaboration server or an information terminal of the present invention.

FIG. 2 is a schematic view of an embodiment of the hardware structure of the collaboration server 110 used in the present invention. Referring to FIG. 2, the collaboration server 110 (FIG. 1) comprises a central processing unit (CPU) 1 and a main memory 4. The CPU 1 and the main memory 4 are connected to a hard disk drive 13 as an auxiliary storage unit through a bus 2. A floppy disk drive 20 and recording medium drives 26, 28 and 29 for driving a magneto-optic disk (MO), a compact disk read-only memory (CD-ROM) and the like are connected to the bus 2 through a floppy disk controller 19, an integrated drive electronics (IDE) controller 25, a small computer system interface (SCSI) controller 27 and the like, respectively.

A floppy disk (or another recording medium, such as MO or CD-ROM) is inserted into the floppy disk drive 20 (or the recording medium drive 26, 28 or 29), and the code of a computer program, which gives instructions to the CPU 1, etc., in cooperation with an operating system to implement the present invention, can be recorded onto the floppy disk or the like, the hard disk drive 13 or the ROM 14. The computer program is loaded into the memory 4, and executed. The code of the computer program is compressed or split into a plurality of groups, which can be recorded into a plurality of recording media.

The collaboration sever 110 (FIG. 1) further comprises user interface hardware. In other words, the collaboration server 110 may have a pointing device 7 such as a mouse or a joystick, a keyboard 6 and a display device 11 for presenting visual data to a user. A touch panel may also be used as input means. A printer can be connected to the bus 2 through a parallel port 16, and a modem can be connected to the bus 2 through a serial port 15. The collaboration server 110 can be connected to a network through the serial port 15 and either the modem or a communication adapter card 18 such as an Ethernet or a Token Ring Card to communicate with other computers.

A speaker 23 receives voice signals, acquired through digital/analog (D/A) conversion by an audio controller 21, via an amplifier 22, and outputs them as voice. The audio controller 21 performs analog/digital (A/D) conversion for voice information received from the outside through a microphone 24, thus making it possible to take the voice information in the collaboration system.

It should be easily understood that the collaboration system 110 of the present invention can be realized by information terminals having communication functions, which include ordinary personal computers (PCs), workstations, notebook PCs, palm top computers, network computers and the like, or by a combination of these information terminals. However, these constituent components are merely examples, and not all of these components are essential.

Since the hardware structure described is not essential for collaboration support of the information terminals, the audio controller 21, the amplifier 22, the speaker 23 and the microphone 24, which are necessary for voice processing, the keyboard 6, the mouse 7 and a keyboard/mouse controller 5, which permit a user to make direct inputs, and a CRT 12, a display device 11, a video memory (VRAM) 9, a video graphics adapter (VGA) 8, and media processing devices 19, 25 and 27, which offer visual data to the user, may be omitted.

With respect to the constituent components of the, various modifications, such as combining a plurality of machines and distributing the functions to the machines can easily be conceived by persons skilled in the art, and these modifications are within the scope of the present invention. Like the collaboration server 110, a client information terminal 130 and an agent information terminal 170 (see FIG. 1), which are employed in the present invention, can be embodied by the hardware structure shown in FIG. 2. To be more specific, the information terminal 130 only needs to be able to enter a request for acquiring information, to transmit the request and to receive a result to the request. Accordingly, the information terminal 130 can be embodied by information terminals including ordinary personal computers (PCs), workstations, notebook-type PCs, palm top PCs, electric home appliances such as television sets incorporating computers therein, game machines having a communication function, telephones, facsimile machines (FAX), portable telephones, personal handy phone system (PHS) and electronic pocketbooks. The information terminal 130 can also be embodied by a combination of these constituent components.

Available operating systems on the collaboration server 110, which support a GUI multi window environment without requiring any special software, include Windows NT (trademark of Microsoft Corp.), Windows 9x (trademark of Microsoft Corp.), Windows 3. x (trademark of Microsoft Corp.), OS/2 (trademark of IBM Corp.), MacOS (trademark of Apple Computer Inc.), Linux (trademark of Linus Torvlds) and X-WINDOW system (trademark of MIT Laboratory ) on AIX (trademark of IBM Corp.). Operating systems, which support a character-based environment, such as PC-DOS (trademark of IBM Corp.) and MS-DOS (trademark of Microsoft Corp.), are also available. Furthermore, operating systems which are installed into network computers, such as real time OSs including OS/Open (trademark of IBM Corp.) and VxWorks (trademark of Wind River Systems Inc.), and JavaOS are available. Accordingly, the operating system on the collaboration server 11 is not limited to a particular operating system environment.

With regard to the client information terminal 130 and the agent information terminal 170, available operating systems, which support a GUI multi window environment in standard, include Windows NT (trademark of Microsoft Corp.), Windows 9x (trademark of Microsoft Corp.), Windows 3. x (trademark of Microsoft Corp.), OS/2 (trademark of IBM Corp.), MacOS (trademark of Apple Computer Inc.), Linux (trademark of Linus Torvlds) and X-WINDOW system (trademark of MIT Laboratory) on AIX (trademark of IBM Corp.). Operating systems, which support a character-based environment, such as PC-DOS (trademark of IBM Corp.) and MS-DOS (trademark of Microsoft Corp.), are also available. Furthermore, operating systems which are installed into network computers, such as real time OSs including OS/Open (trademark of IBM Corp.) and VxWorks (trademark of Wind River Systems Inc.) and JavaOS, are available. Accordingly, the operating systems on the client information terminal 130 and the agent information terminal 170 are not limited to a particular operating system environment.

C. System structure

Figure 3:
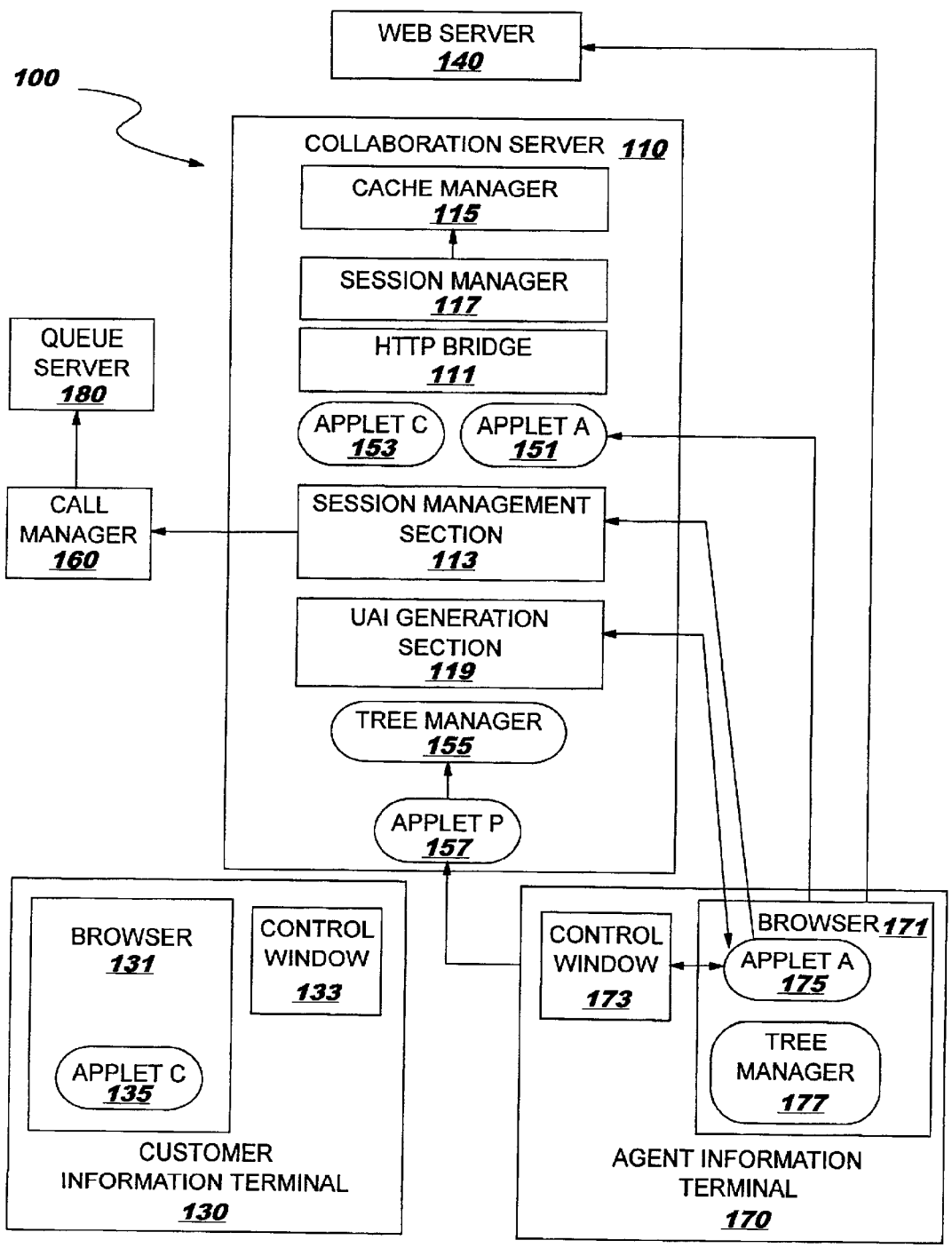
Figure 4:
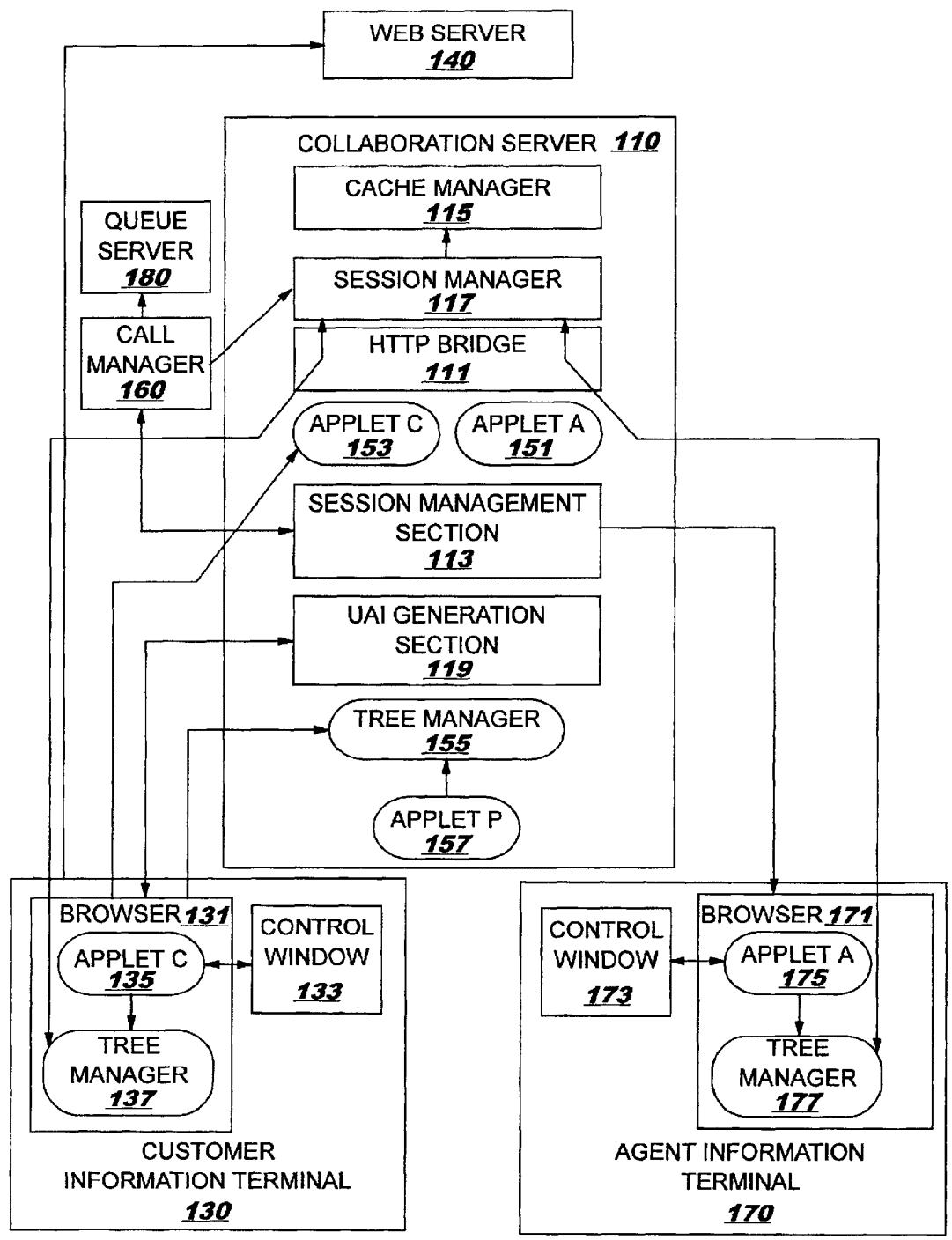
FIG. 4 is a function block diagram showing the system structure of a collaboration system in the present invention, which includes processing elements that operate when an agent and a customer start the collaboration.
Figure 5:
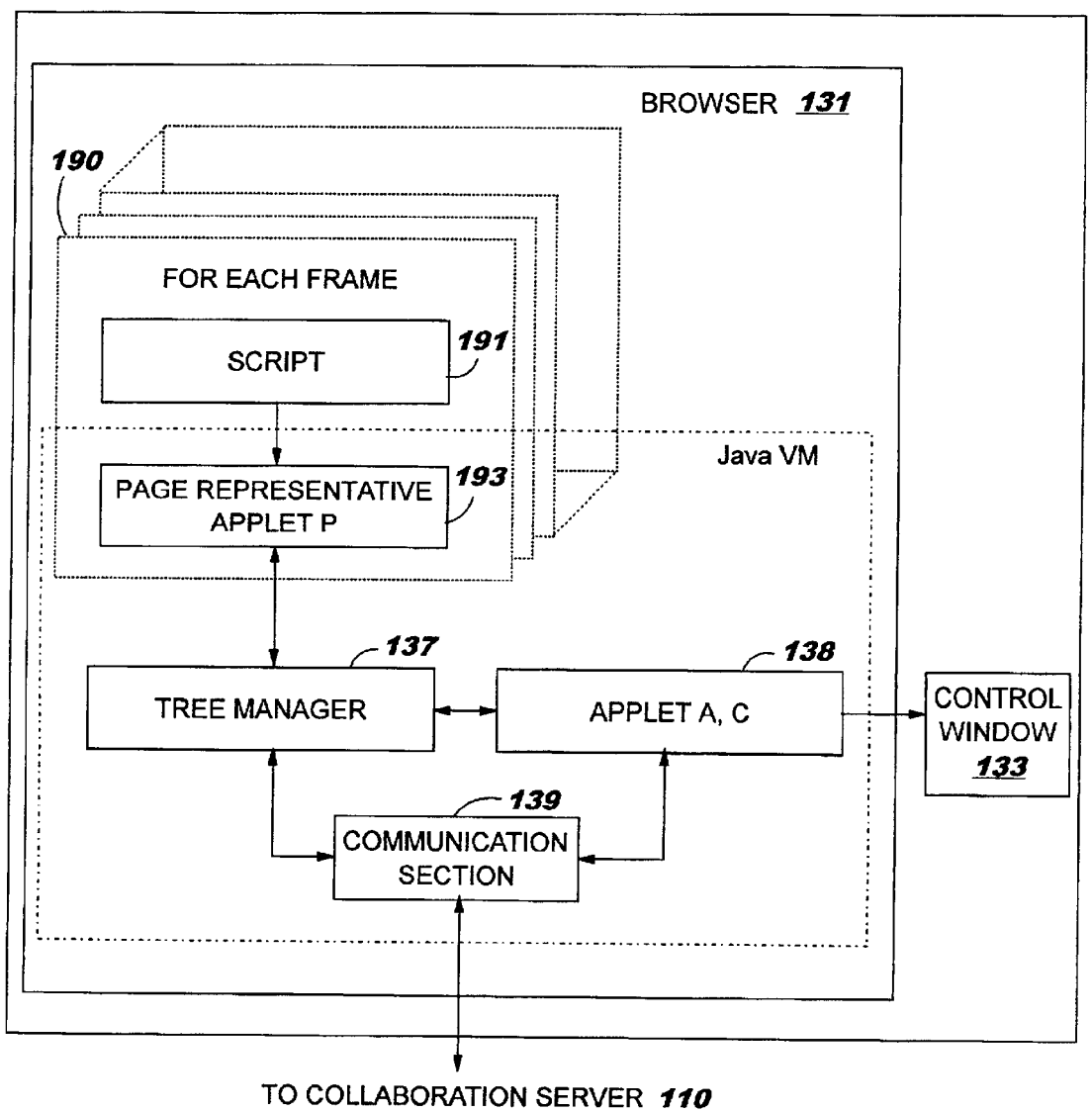
FIG. 5 is a function block diagram showing processing elements of a client information terminal.
Figure 6:
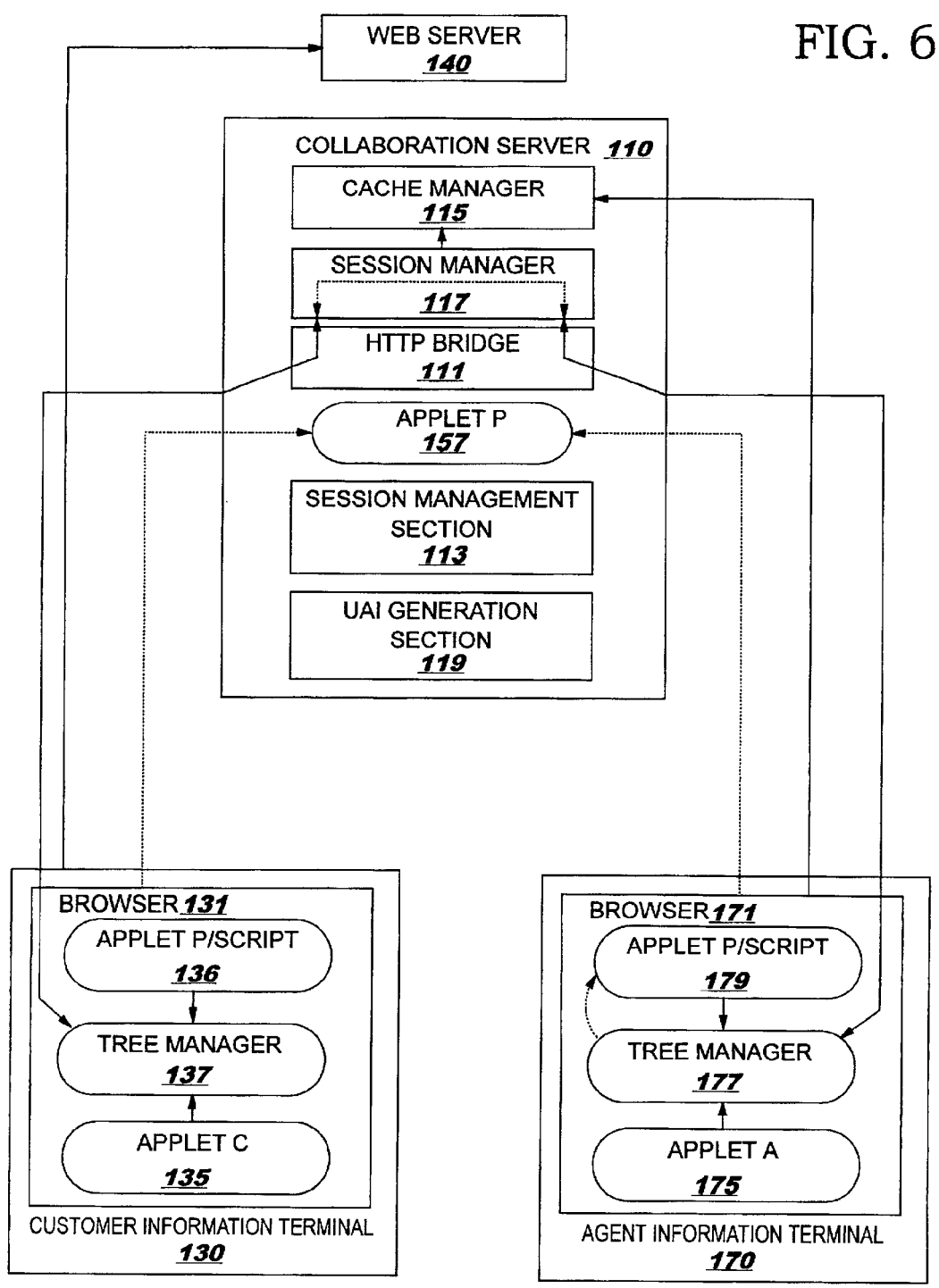
FIG. 6 is a function block diagram showing the system structure of the collaboration system in an embodiment of the present invention, which includes processing elements that operate when an event accompanied with a change in a URL in a customer information terminal occurs.

FIG. 3 is a block diagram showing a system structure of the collaboration system of the present invention, which includes processing elements which operate at the time the agent logs onto the system. FIG. 4 shows a function block diagram which includes processing elements which operate at the time an agent and a customer start the collaboration. FIG. 5 is a function block diagram showing processing elements of the client information terminal. FIG. 6 is a function block diagram which includes processing elements that operate at the time an event accompanied with a change in URL occurs on the customer information terminal 130. Referring first to FIG. 3, the collaboration system 100 in the preferred embodiment of the present invention includes a customer information terminal 130, a collaboration server 110, a Web server 140, a call manager 160, a queue server 180 and an agent information terminal 170. The collaboration server 110 includes a cache manager 115, a hyper text transfer protocol (HTTP) bridge 111, a session management section 113, a session manager 117, a UAI generation section 119, an applet A 151, an applet C 153, a tree manager 155 and an applet P 157.

The collaboration server 110 in the preferred embodiment of the present invention also functions as a Web server, and holds Java Classes and Scripts such as classes of the applet A 151 for the agent, the applet C 153 for the customer, the page representative applet P 157, a tree manager 155 referred by the applet P 157 and communication related classes. These are placed on a special directory which is not processed by the cache manager 115, and requests to these are processed by the collaboration server 110 itself as the Web server. Technology for establishing a session between the client information terminal 130 and the agent information terminal 170 can be found in Corepoint Web Collaboration ("Corepoint" is a trademark of IBM Corp.).

The HTTP bridge 111 connects to the session manager 117 with a socket, and supports communications between browsers 131 and 171. The HTTP bridge 111 holds a UAI-socket management table 280 shown in FIG. 11, and adds an entry in the UAI-socket management table 280 every time a connection is made by any browser.

The session management section 113 receives a log-on request from the agent, and transmits it to the call manager 160. The session management section 113 receives a notification from the call manager 160 of the normal completion of the log-on processing of the agent, and informs the agent of this notification.

The cache manager 115 caches contents (HTTP response) of a hypertext markup language (HTML) to the HTTP request transmitted by the Web server 140. The cache manager 115 executes a process of embedding applets and scripts.

The session manager 117 receives from the call manager 160 a pair of UAI's from the agent and the customer and executes the collaboration therebetween, and searches for an unused entry in the session management table of FIG. 7 to assign an unused session number, and recording the UAIs of the agent and the customer. The assigned session number is returned to the call manager 160. Furthermore, the session manager 117 notifies the cache manager 115 of the set of the UAIs of the agent and the customer. Upon receipt of this notification, the cache manager 115 manages which request is to be associated with which request in the cache management table 270 shown in FIG. 10.

The UAI generation section 119 generates an ID for uniquely identifying participants in the collaboration and sets it as a Cookie of the browser.

The applets C 135 and 153 generate a control window 133. The applets C 135 and 153 transmit an agent assignment request to the session management section 113, the agent assignment request including information, which the user has entered in the control window 133, and UAI. If all of agents are busy, the applets C 135 and 153 acquire a position in a queue, and deliver their information to the control window 133.

The applets A 151 and 175 generate a control window 173, and transmit log-on information including information which the agent has entered in the control window 173, and UAI to the session management section 113 on the collaboration server 110.

The agent side control window 173 provides a user interface to enter an agent ID and a queue name (skill group, etc.), and to execute a log-on. When there are groups of agents serving different requests, for example, one group serves the requests regarding lady's clothing and another group men's clothing, the queue name indicates the sort of requests that can be processed by the agents, and the queue name is a concept that is generally known as a skill group in the call center. Implementation of the skill group is not essential, and can be omitted. In the case where the skill group is omitted, the queue name may be fixed. The agent control window 173 makes a display for showing the present state of the agent, such as the state of the agent waiting for connection by a customer.

In the preferred embodiment of the present invention, the Web browser 131 is installed in the customer information terminal 130, and the Web browser 171 is installed in the agent information terminal 170. The Web browsers 131 and 171 transmit their requests to any Web server specified by a URL. The Web browsers 131 and 171 receive responses transmitted from the Web server 140, and display the responses on the display screens, respectively. The Web browsers 131 and 171 are also capable of executing applets acquired from the collaboration server 110 and the Web server 140. In FIG. 3, for the sake of descriptive convenience, the Web server 140 is drawn as a single server. However, the Web browsers 131 and 171 are able to transmit html file acquisition requests to various kinds of Web servers.

In the preferred embodiment, when an html includes frames, a script for detecting a partial tree structure and an applet representative of a page are embedded in each html constituting each frame, and a class for detecting a tree structure and a class for communication are loaded by browser. These classes operate in the Java Virtual Machine of the browser, and one set of the classes for detecting the tree structure and the classes for communication always exist regardless of the number of htmls constituting the frame. For this reason, the browser must satisfy the following three conditions in the present invention:

Java is available;

Script (normally JavaScript) is available; and

It is possible to call a Java method from the foregoing Script.

Browsers which satisfy these three conditions are, for example, Netscape Communication version 4.5× and later versions and Microsoft Internet Explorer 4.01 and later versions for Windows Operating System (trademark of Microsoft Corp.). Once sufficient functions are defined in Document Object Model (DOM) and Java binding, whose standardization is in progress in World Wide Web Consortium (W3C), and then these are installed in a browser, it will be possible to make installment without the use of script. If frames using html is not supported, a browser which does not support a script can be embodied.

The customer side control window 133 provides the customer with an interface to enter personal information such as client's name and phone number, sorts of questions and contents of the questions. Furthermore, the customer side control window 133 displays information indicating the state of the customer such as the state of a queue.

The tree managers 137, 155 and 177 analyze tree structures of pages displayed in the browsers 131 and 171. The communication section 139 (FIG. 5) communicates with the session manager 117 via the HTTP bridge 111. The script 191 acquires its own information and parent's information such as URL in which it is embedded, parent's URL, the number of children of the parent and its position relative to the parent, and delivers the information to an applet inserted into each html.

The call manager 160 holds the agent management table 230 as shown in FIG. 8. When the agent performs a log-on, its state is updated, and a UAI assigned to the agent is also set. Moreover, the call manager 160 manages the customer queue 250 whose one entry is shown in FIG. 9, and when a collaboration request is made from the customer, the call manager 160 prepares an entry and enters it into a queue of the queue server 180. If an agent corresponding to the queue is in a waiting state, the queue server 180 assigns the request to the agent. If there are no agents in the waiting state, the queue server 180 puts the request into the queue.

The queue server 180 and the call manager 160 can be any of various products that are currently available, based on system requirements such as being able to integrate with the call center. For example, when Corepoint Web Collaboration is adopted as the collaboration server 110, Virtual ACD is used in order to integrate Corepoint Web Collaboration with Corepoint Telephony (trademark of IBM Corp.), and in order to use Corepoint Web Collaboration without call center produce, they can be realized by adopting Software ACD and Easy ACD. When Corepoint Web Collaboration is integrated with Corepoint Telephony, the customer is able to talk with the agent through a phone line, simultaneously with the collaboration (synchronization processing) by the browser.

Components such as the queue server 180 for managing agent assignment and the call manager 160 can be placed on the collaboration server 110. As shown in FIGS. 3, 4 and 6, however, the queue server 180 and the call manager 160 may be placed on another server, and only a client for communicating with this server need be placed in the collaboration server 110. This allows the server for performing the agent assignment to be placed within a firewall, thus constructing a high-security system.

The function blocks shown in FIGS. 3 through 6, which have already been described, are logic function blocks that need not necessarily be realized by one integrated hardware or software. Those function blocks can be realized by complex or common hardware and software. Moreover, not all function blocks shown in FIG. 3 are always essential to the present invention.

For example, providing the collaboration server 110 with the agent assigning function can eliminate the call manager 160 and the agent assignment of the queue server 180.

D. Operation Procedure

D-1. Log-on of the Agent

Figure 16:
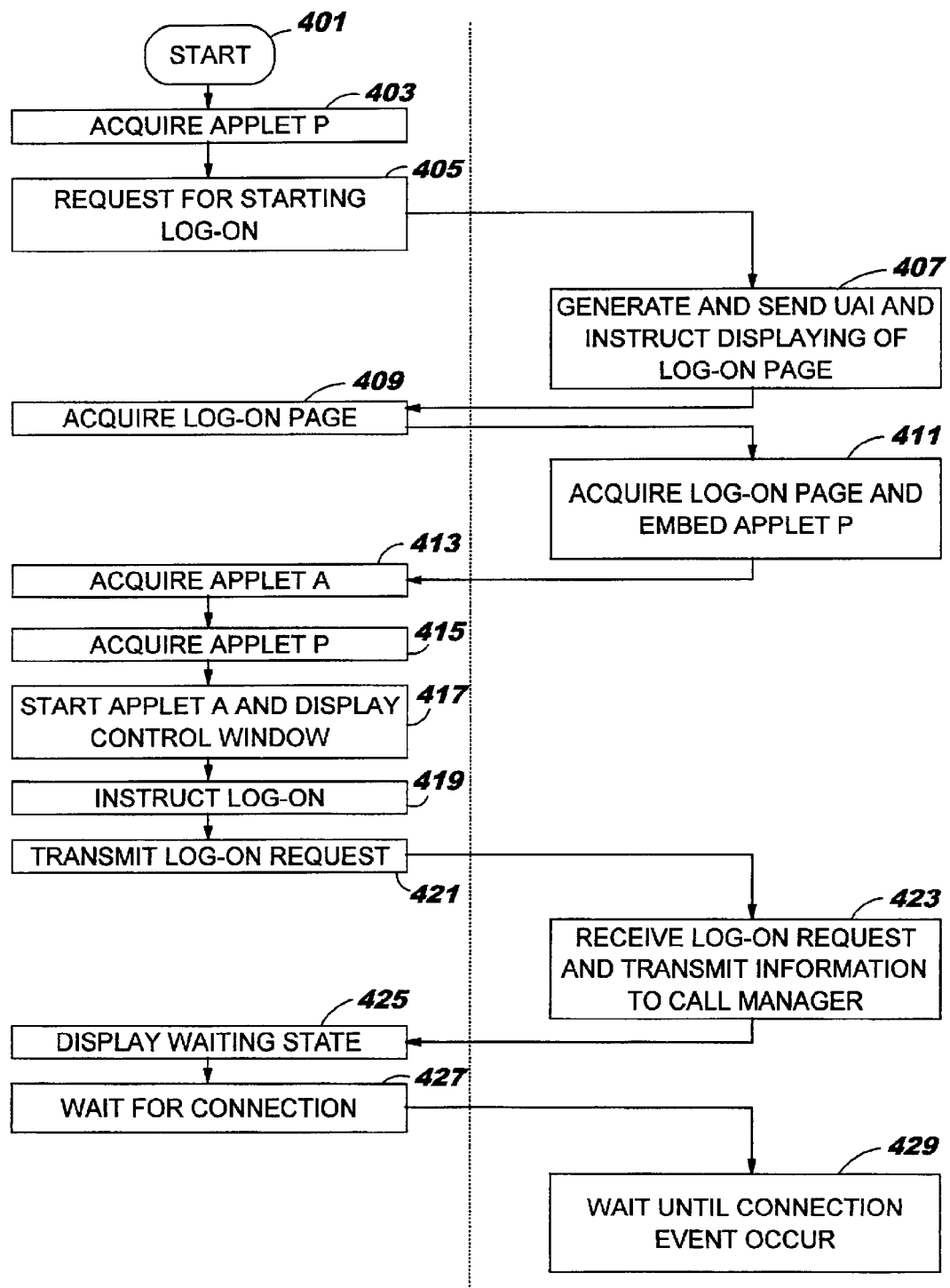
FIG. 16 is a flowchart showing procedures of log-on by the agent in an embodiment of the present invention.

FIG. 16 is a flowchart showing procedures of log-on by the agent. First, the agent enters a predetermined URL into the browser 171 and accesses the collaboration server 110. Thus, a procedure shown in FIG. 16 starts (step 401). When a page for instructing the log-on is displayed, an APPLET tag for embedding a page representative applet P exists in the page, and thus the applet P, a communication related class and a tree manager 177 are acquired from the collaboration server 110 (step 403). Thus, when a script tries to call the applet P, in a subsequently described synchronizing process, the applet P, the tree manager 177 and the communication related class are placed in the cache of the browser and are ready for immediate use. To be more specific, embedding is carried out by converting an HTML in the following manner:

Change 1 (BODY tag portion)
<BODY onload="CWCLoadF( )" onResize=". . .">
<applet code="CWC001.class" name="CWCAppl"
  @codebase="/Tree/tu" align="right"
hspace="0" vspace="0" width="0" height="0">
</APPLET>
Change 2 (immediately before /BODY tag)
<script language="JavaScript">
Window.setTimeout ("CWCLoadF( )", 1000);
function CWCLoadf( ) {. . .
</script>
</body>

To prevent a problem with some browsers in which merely changing the size of a browser window re-loads html and fails to call the function of JavaScript, contents of the function are directly embedded in onResize of the body tag. Moreover, in order to prevent other troubles, the rest of the script is embedded in an html immediately before /body tag. Note that codebase parameters of an actual applet tag will differ depending on the configuration of the server. A class name includes a package name that includes a company name which implements or uses the system. By this change, when the load finishes, the function of JavaScript is invoked by onload designation. This function of JavaScript acquires URL from the present window to the topmost window, and number information of window in each node. Examples of information acquired are shown in FIGS. 12 and 13. In these examples, information acquired by the script which is embedded in abc/index.htm is shown. Since an onload event does not occur in some browsers when load is stopped by pushing a stop button during loading, the script is set so as to invoke the function of JavaScript by a timer. Although JavaScript function may be called twice in some cases, by designing an applet to use information that arrives first, it is possible to cope with the browser that does not generate an onload event when loading is aborted. At the same time, when loading an image on the page takes time, a tree structure can be acquired without waiting for the termination of loading.

When the agent requests the initiation of a log-on processing by clicking the log-on button, the request is sent to the UAI generation section 119 (step 405). The UAI generation section 119 generates UAI for the agent of the present invention, and sends back the UAI and redirection to a collaboration log-on page (step 407). The UAI is an ID for uniquely identifying participants in the collaboration, and is set as a Cookie of the browser. In this embodiment, although the redirection is used, there is a technique such as transition by a META tag as the technique to display the specific page, and the use of the redirection is not an essential factor of the present invention.

The browser 171 acquires a log-on page via the cache manager 115 (step 409, FIG. 16). At this time, since the UAI has already been set, the cache manager 115 acquires the previously determined log-on page from the Web server 140, and changes the page so as to embed the applet P and the script. Thereafter, the cache manager 115 returns the log-on page to the agent browser 171 (step 411). In the log-on page, an APPLET tag for specifying the applet A 151 is included.

The agent browser 171 acquires the applet A 151 by an instruction of the applet tag (step 413). In the preferred embodiment of the present invention, the APPLET tag which specifies the applet P 157 is, by the cache manager 115, also embedded in HTML acquired in this step. However, since the acquirement was performed in the step 403, actual acquisition is not performed.

When the applet A 175 is invoked by the browser 171, the applet A 175 displays the control window 173 (step 417). The control window 173 is a user interface provided for entering an agent ID, the name of a queue (skill group) and the like in sending a log-on request. When a job is different from one agent to another, such as men's suit and lady's suit, the queue name indicates types of requests that can be processed by the agents, and the queue name is that is generally known as a skill group in the call center. Note that loading of the skill group is not essential, and may be omitted. In this case, the name of the queue may be fixed.

When the agent clicks a button for instructing log-on in the control window 173 (step 419), the applet A 175 transmits the information entered by the agent and the log-on information including the UAI to the session management section 113 on the collaboration server 110 (step 421). The session management section 113 transmits the information to the call manager 160 (step 423). The call manager 160 transmits the information to the queue server 180. The queue server 180 updates the state of the agent in the agent management table 230 shown in FIG. 8, and also sets the UAI assigned to the agent. To be more specific, the agent ID 231 and the UAI 237 are registered, and the skill group of the agent is set in the queue name 233, and information to the effect that it is in a waiting state is set in the state 235.

In this embodiment, the function for generating the UAI and the session management are realized as a servelet, but it is sufficient to only uniquely identify the client. Accordingly, this embodiment can be realized by any known method for implementing a Web server application such as CGI. In the preferred embodiment of the present invention, the queue server 180 manages the queue of the customer, and various kinds of queue servers 180 can be selected based on the system requirements such as being able to integrate with a call center. The session management session section 113 receives from the call manager 160 a notification to the effect that the log-on processing by the agent finishes normally, and gives notification to the applet A 175. The applet A 175 displays a message indicating that the agent is now waiting for customer connection on the control window 173, and waits for the connection (step 425 and 427). The session management section 113 of the collaboration server 110 also waits for occurrence of a connection event (step 429).

D-2. Log-on By Customer and Start of Collaboration

Figure 17:
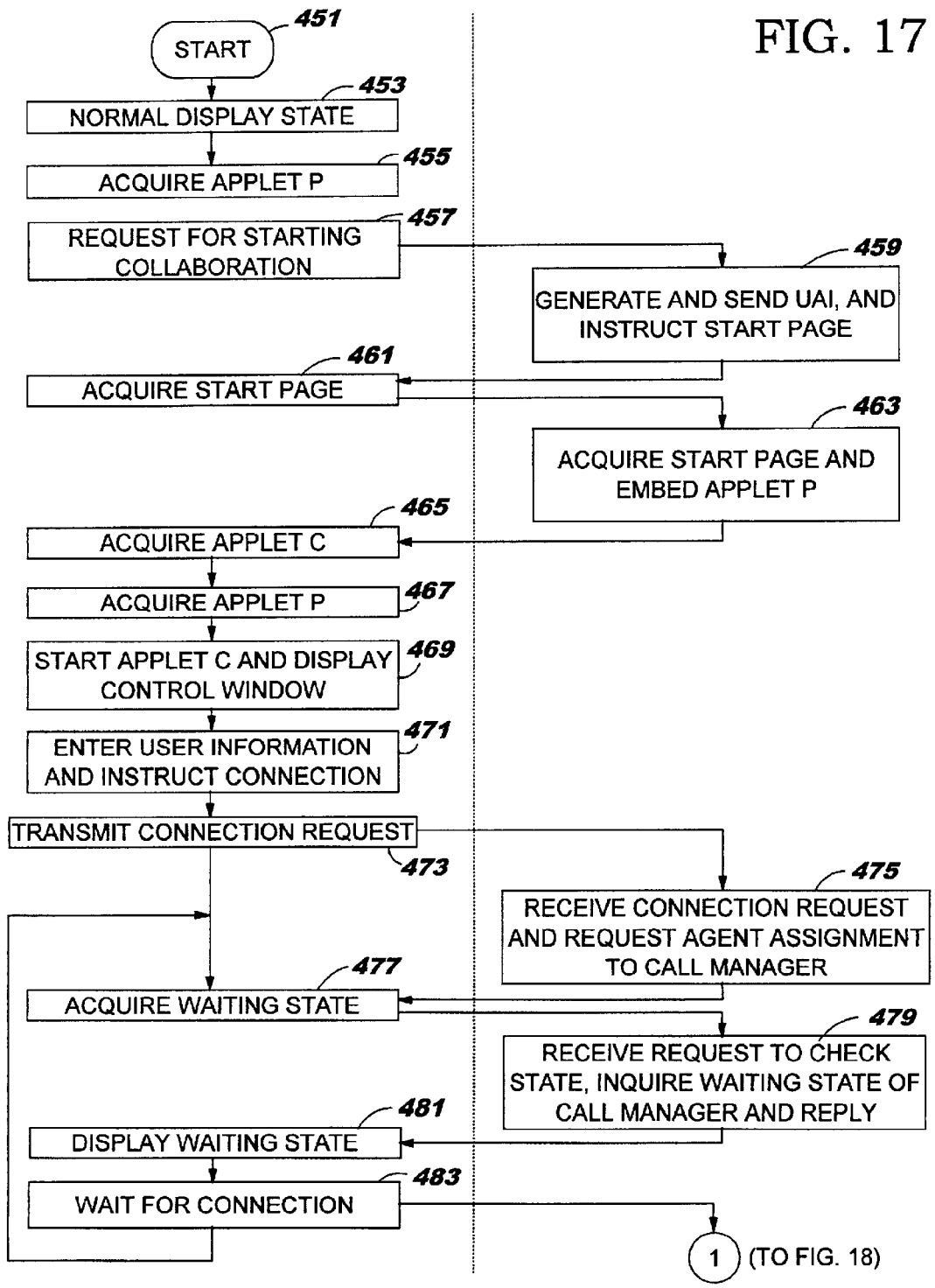
FIGS. 17 and 18 are a flowchart showing operation procedures when the customer logs-on to start collaboration with the agent.
Figure 18:
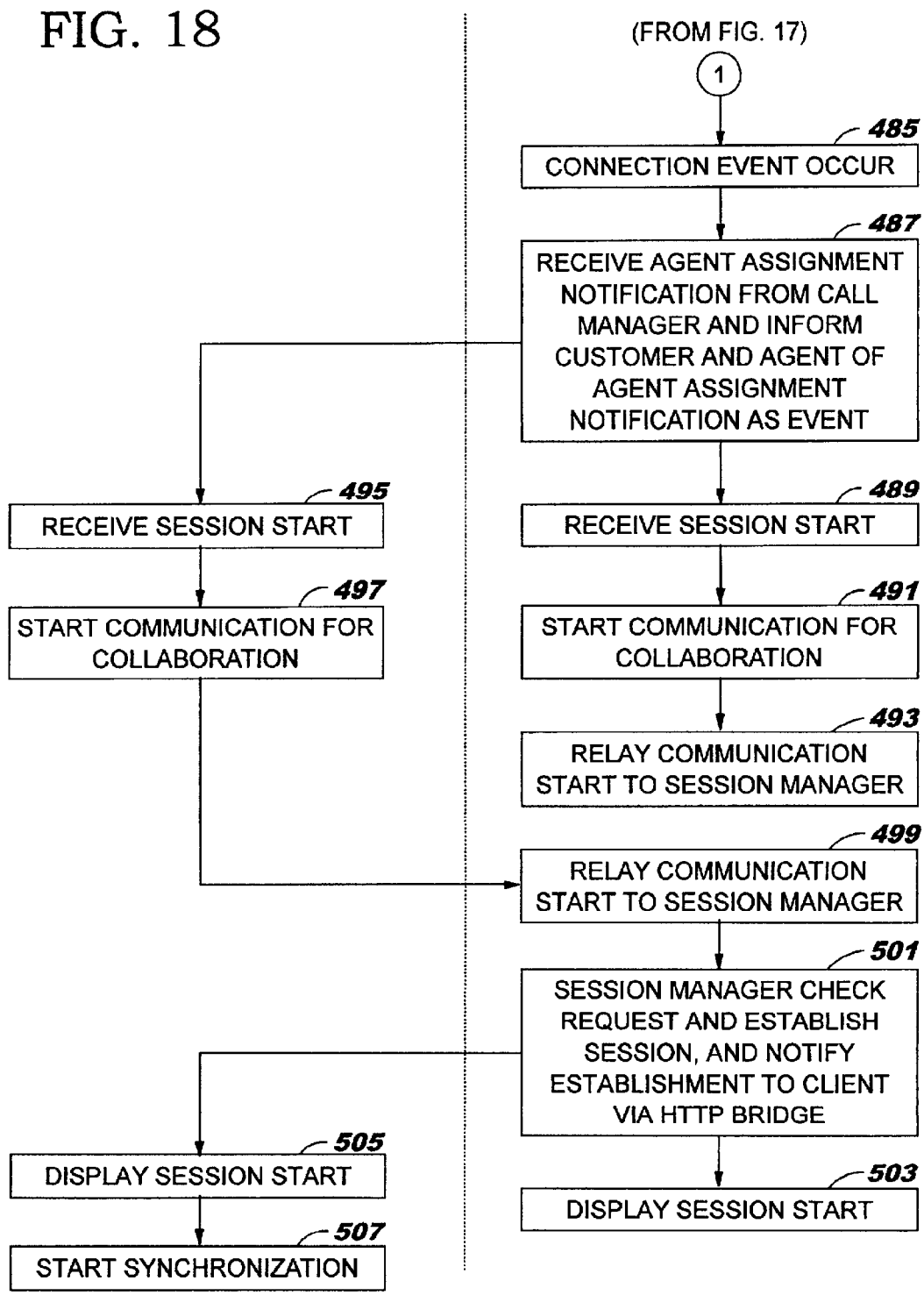

FIGS. 17 and 18 are flowcharts showing procedures in which the customer performs log-on and starts collaboration with the agent. In an initial state of this flowchart of FIG. 17, the browser of the user accesses an arbitrary Web server which stores a Web page (step 451). Then, the customer accesses a specified Web server 140 having a page for guiding to a page which has a button for starting collaboration with the agent (step 453). In the preferred embodiment of the present invention, by separating the collaboration server 110 and the Web server 140, the load of the collaboration server 110 will not increase when the number of users who do not need the collaboration increases, since those users who do not need collaboration, access only the Web server 140. However, it is also possible to take a different form in which customers access a Web server through a Collaboration Server from the beginning, in order to provide compatibility where an existing client code of Corepoint Web Collaboration is used.

When the customer displays a page having a call button, the page includes a script which creates a call button and generates an APPLET tag to embed the page representative of applet P in the case where UAI is not set in the page. The APPLET tag is generated by this script, and the applet P, the tree manager and the communication related classes are acquired from the collaboration server 110 (step 455).

In this preferred embodiment of the present invention, when the customer clicks the call button and requests initiation of collaboration, the request includes a URL without a host name portion, which specifies an original page. This request is sent to the UAI generation section 119 (step 457). The UAI generation section 119 generates UAI (User Access Identifier) of the present invention for the customer, and sends back the UAI and redirection to a collaboration log-on page that is actually a page having a call button, acquired via the cache manager (step 459). The UAI is an ID for uniquely identifying participants in the collaboration.

Browser 131 acquires an initial display page via the cache manager 115 based on an instruction of the redirection (step 461). At this time, since the UAI is set, the cache manager 115 acquires the previously decided page from the Web server 140, and after the cache manager 115 embeds the applet P 157 and the script, the cache manager 115 sends it back to the customer browser 131 (step 463). The initial display page includes an APPLET tag for specifying applet C153, which is a collaboration application.

The customer browser 131 acquires the applet C 153 based on an instruction of the APPLET tag (step 465). The APPLET tag for specifying the applet P 157 is embedded by the cache manager 115 in this step, too. However, it was acquired in step 455, and actual acquisition is not executed in this embodiment (step 467).

When the applet C 135 is invoked by the browser 131, the applet C 135 displays the control window 133 (step 469). A structure in which the control window 133 is realized by a browser window may be adopted. Further modifications are also possible, such as a structure in which an independent window is not displayed as the control window, the function of the control window is realized by an html and an applet in the browser of the customer, and switching to the original Web page is made after entering information to the control window.

The control window 133 displayed on the customer side is an interface provided for the customer to enter his name, phone number and other personal information and to log-on. When a skill group of the agent is set, the customer can select the skill group, or a skill group corresponding to a page having a call button is automatically set.

When the customer enters predetermined information and requests the start of the collaboration with the agent (step 471), the applet C 135 transmits an agent assignment request including the information entered by the user and UAI to the call manager 160 via the session management section 113 on the collaboration server 110 (step 473).

The call manager 160 prepares the entry 250 of the customer queue shown in FIG. 9, and enters the entry 250 to the queue of the queue server 180 (step 475). If the agent corresponding to the queue name is in a waiting state, the queue server 180 assigns the entry 250 to the agent. If no agent is in a waiting state, the queue server 180 enters the entry 250 into the queue. When no agents in a waiting state are available, the applet C 135 acquires the position in the queue and displays information relating to the position (step 481).

When the agent is assigned to the customer, the call manager 160 notifies the session manager 117 of a set of the agent and the customer (step 485 and step 487). In the flowchart of FIG. 17, the applet C 135 on the customer side can periodically make inquiries to the call manager 160 via the session management section 113 to monitor a change in the queue (steps 477 to 483).

When the agent is assigned to the customer and the session manager 117 receives information relating to the set of the agent and the customer from the call manager 160, the session manager 117 searches for an unused entry of the session management table 210, assigns an unused session number to that information, and records the UAIs of the agent and the customer in the unused entry. Moreover, the session manager 117 notifies the cache manager 115 of a set of UAIs. The cache manager 115 manages which request is to be associated with which request in the cache management table 270 shown in FIG. 10.

The session manager 117 returns the session number to the call manager 160. The call manager 160 notifies the session management section 113 of the completion of the agent assignment and the session number (step 487). This notification is sent to the agent from the session management section 113 (step 489) as well as to the customer (step 495).

The session management section 113 notifies the applet A 175 of the assignment of the agent and the session number (steps 487 and 489). The applet A 175 specifies the session number and the UAI and requests a start of communication to the communication class 139, in order to establish the communication with the tree manager in the browser on the customer side (step 491). When a text chat is performed, the applet A 175 specifies also the name or nickname of the agent when the communication starts. The communication class 139 starts the communication with the session manager 117 via the HTTP bridge 111 (step 493).

A socket connection is made between the HTTP bridge 111 and the session manager 117 for each browser. The HTTP bridge 111 holds the UAI-socket management table 280 shown in FIG. 11, and adds an entry every time the HTTP bridge 111 initiates the connection with the session manager 117. When the session with the HTTP bridge 111 is established, the session manager 117 updates the socket information in the session management table 210.

On the other hand, the session management section 113 notifies the applet C 135 on the customer of the assignment of the agent and the session number (steps 487 and 495), and the applet C 135 specifies the session number and requests a start of the communication to the communication class 139, in order to establish the communication with the tree manager 177 in the browser on the agent side (step 497). The communication class 139 starts the communication with the session manager 117 via the HTTP bridge 111 (steps 497 and 499). When the session with the HTTP bridge 111 is established, the session manager 117 updates the socket information in the session management table 210.

In this preferred embodiment of the present invention, by use of URL Connection of Java, the communication between the communication class 139 and the HTTP bridge 111 can be established even when a firewall such as proxy and socks is provided between the collaboration server and the browser. When passing through the firewall is not required, the communication capability may be implemented using Socket.

As soon as the session manager 117 receives two socket connections constituting the session, the session manager 117 notifies the applet A 175 and the applet C 135 of the start of the communication (step 501). Upon receipt of the notification, the applet A 175 and the applet C 135 display the start of the communication (steps 503 and 505), and the applet C 135 requests initiation of synchronization (step 507). Such steps are carried out to allow the page displayed on the customer side to be displayed on the agent side.

D-3. Synchronization of Customer and Agent Browsers With Each Other.

Figure 19:
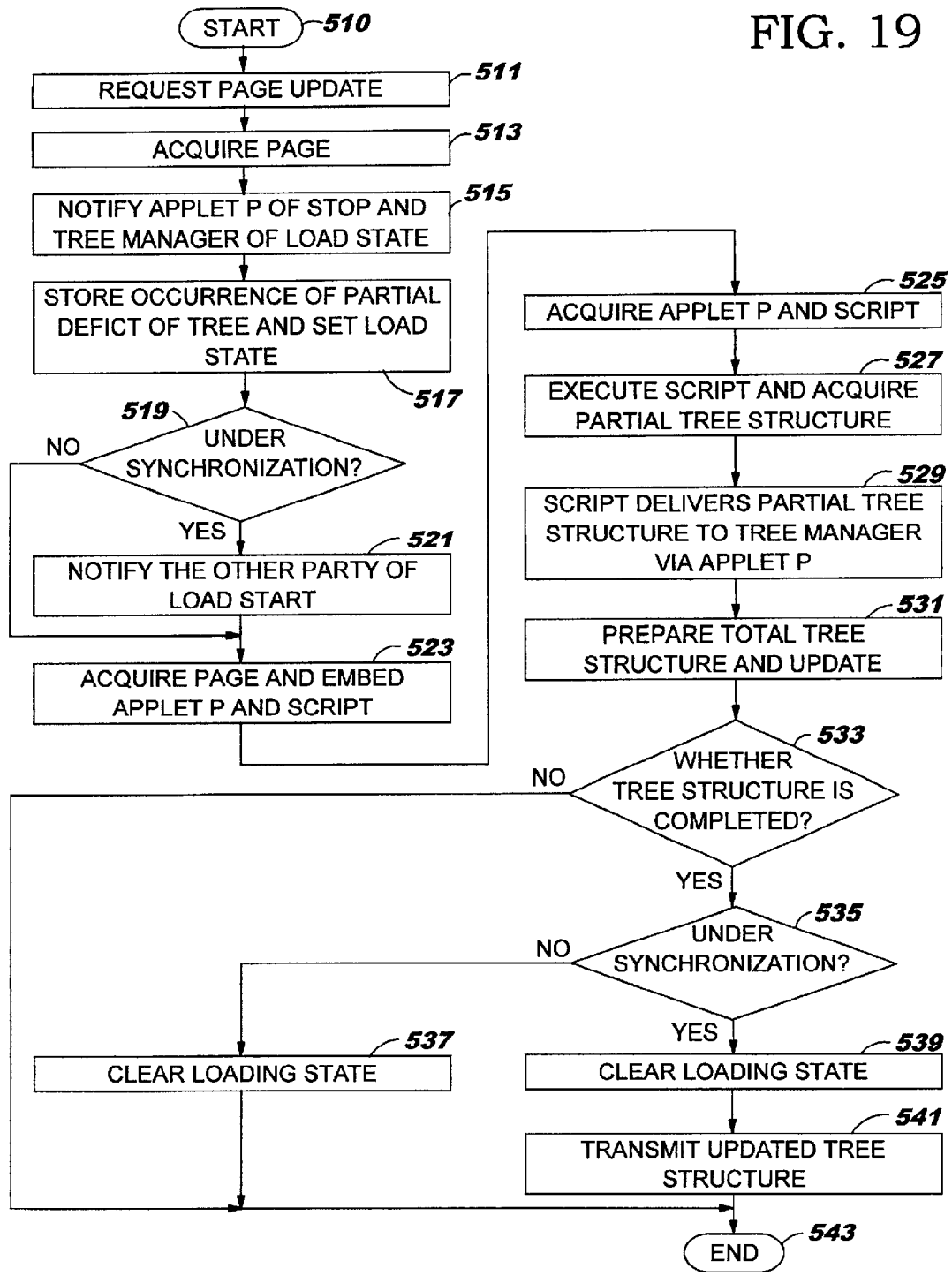
FIG. 19 is a flowchart showing synchronization processing procedures in one embodiment of the present invention, in the case where with a certain Web page displayed, the customer clicks a link and enters URL to move to another page.
Figure 20:
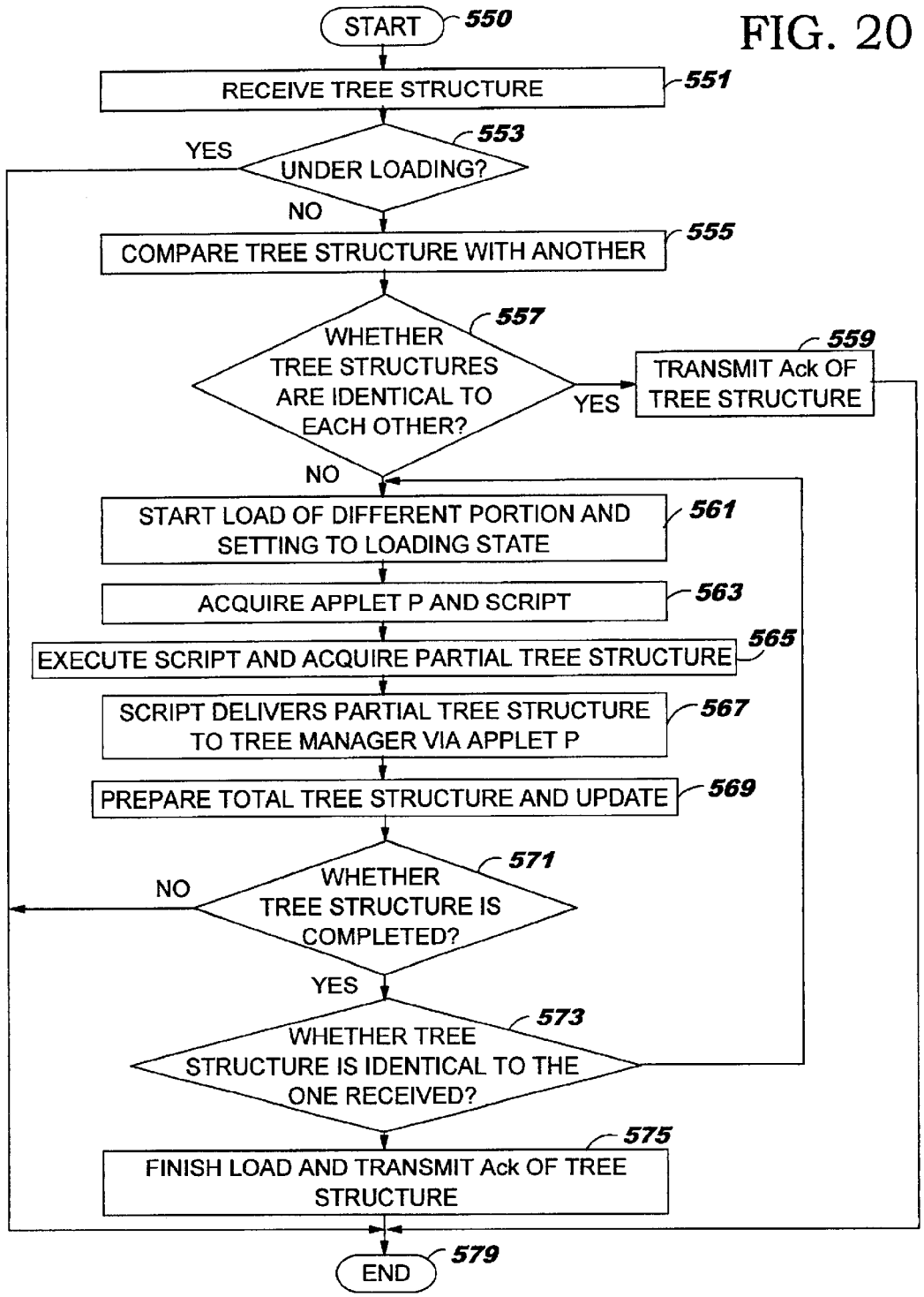
FIG. 20 is a flowchart showing synchronization processing procedures in another embodiment of the present invention, in the case where with a certain Web page displayed, the customer clicks a link and enters URL to move to another page.

FIGS. 19 and 20 are flowcharts showing synchronizing process procedures when the Web page is changed from the currently displayed Web page by some means such as clicking of a link or entering of a URL by the customer. Although the flowcharts of FIGS. 19 and 20 illustrate the example in which the change of the page is initiated on the customer side, the customer and the agent are symmetrical with each other with respect to the synchronization. The same processing procedures are executed without dependance upon which page the movement occurs.

When the customer requests the transition to a page (step 511), the browser 131 acquires the page via the cache manager 115. The cache manager 115 acquires the Web page from a predetermined Web server because of the existence of a UAI, and stores it in a cache managed by the cache manager 115. At the same time, the cache manager 115 embeds a tag for specifying the applet P and the script 157, and sends it back to the customer browser 131 (step 513).

The browser deletes the page that has been displayed before displaying a new page. At this time, a stop method of the applet P 136 that has been displayed previously is called out. FIG. 5 is a function block diagram showing constituent components at the time of synchronization of the client information terminal 130. The applet P 193 gives notification that it will stop to the tree manager 137 (step 515). Upon receipt of the notification, the tree manager 137 detects that deficits occur in the displayed contents, and notifies the other party of a loading start state (steps 517 to 523). These steps are carried out to display the state of the customer browser on the agent side, and are not essential for synchronizing the pages. The applet P 193 and the script 191 have already been in the cache, and an actual acquirement does not occur (step 525).

When the display of a page to which transition has been made is completed, the script 191 is invoked with onload of the page or a timer as a trigger. The script 191 acquires a partial tree structure (step 527). The partial tree structure is a collection of the URLs of a parent, the number of children of the parent and the position of the script under the parent from the html containing script to the top level html. In FIGS. 12 and 13, the example of this is shown. Note that when multiple browser windows exist, it is possible to distinguish the window and synchronize each of them, by including the Name attribute of the top level Window as a part of the partial tree structure and use the value of the Name attribute as the name of the tree.

When no frame exists, only one html exists in the whole of the browser. Accordingly, the partial tree structure and the total structure are identical to each other. When a frame exists, there are partial tree structures equal in number to the leaf htmls.

When the frame support is not required, only one html exists in the whole of the browser. In this case, the applet can acquire the URL of the loading side and participation of the script 191 is unnecessary. The script 191 delivers the partial tree structure to the applet P 193. The applet P 193 delivers its own handle and the partial tree structure to the tree manager 137 (step 529).

Figure 14:
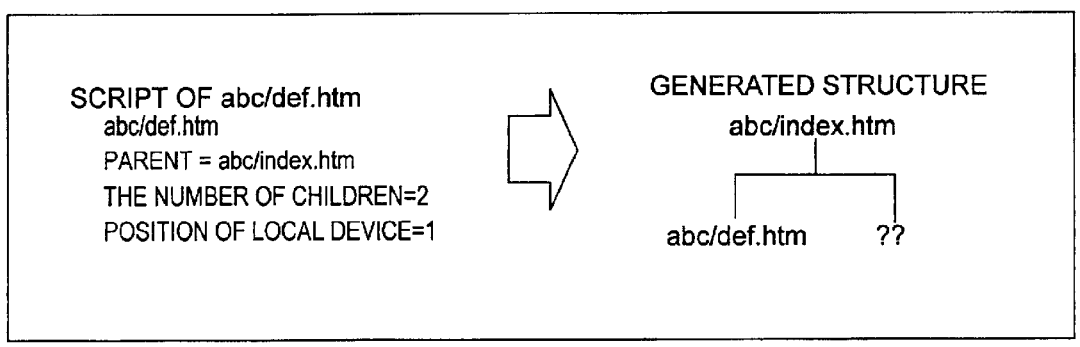
FIG. 14 is a conceptual view for explaining steps for generating a partial tree structure in an embodiment of the present invention.
Figure 15:
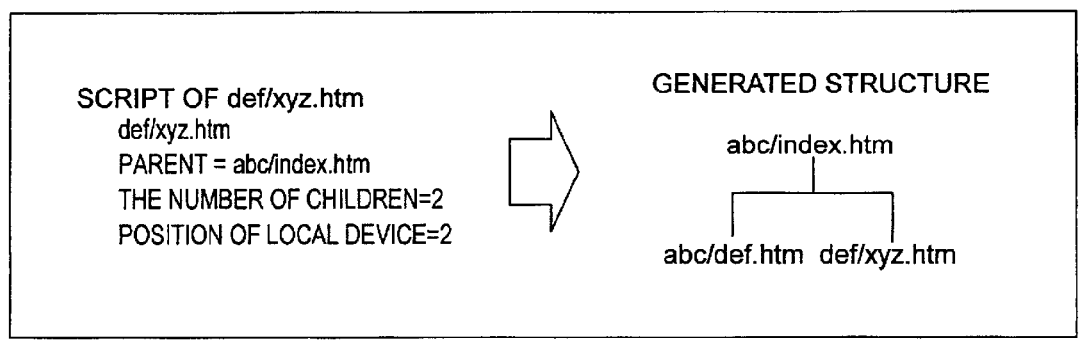
FIG. 15 is a conceptual view for explaining steps for generating a partial tree structure in an embodiment of the present invention.

The tree manager 137 synthesizes the tree structure each time the partial tree structure is received (step 531). FIGS. 14 and 15 show an example of the synthesizing procedures. The tree structure completes on receiving partial trees for every leaf html. To be more specific, the script 136 acquires only its own information and parent's information, and delivers this information to the applet P inserted into each html. The applet P passes the information to the tree manager 137 managing the structure of html that is currently displayed. In this embodiment of the present invention, the tree manager (tree management class) 137 is executed as a thread having no GUI within JavaVM, and the one instance of the tree manager is called from the applet of each html within one top level browser window.

As shown in FIG. 12, with respect to information having no frame, the partial tree structure acquired from abc/index.htm becomes abc/index.htm, and abc/index.htm is generated. With respect to information having a frame as shown in FIG. 13, abc/index.htm has two children, and, as shown in FIG. 14, URL of the second child is unknown for the script 191. Information regarding Parent such as URL can be acquired using information such as Parent attribute of Window, which is available for the script. Moreover, when information from the script embedded in def/xyz.htm is delivered to a tree management class, the tree structure is completed as shown in FIG. 15.

When the tree structure is completed and is in a synchronized state (steps 533 and 535), the tree manager 137 transmits a new tree structure to the HTTP bridge 111 (step 541). The HTTP bridge 111 acquires a socket number from UAI and transmits data of the new tree structure to the session manager 117. The session manager 117 which received the data acquires the socket number of the other party who is participating in the session from the session management table 210 of FIG. 7 to specify the socket of the party, and transfers data (step 541).

When the tree manager 139 on the agent side receives the tree structure (step 551), the tree manager 139 compares the present tree structure with the received tree structure (steps 553 to 557). When the present tree structure and the received tree structure are different from each other, the tree manager 139 sets a "load in progress" state and instructs a page to be loaded using AppletContext of the applet P within different html or html of a child of the different html (step 561). When the agent is also in a loading state, it is not processed while the received tree structure is stored (step 553).

Upon receipt of this instruction, the browser 171 attempts to acquire a new Web page via the cache manager 115 (step 561). The cache manager 115 refers to the cache management table 210 shown in FIG. 10, and decides that the html of interest has already been acquired by the browser 131 on the customer side. The cache manager 115 fetches the html that has been stored in a cache, and embeds the applet P and the script that specifies a tag and returns it to the browser on the agent side (step 561). Since the applet P and the script have already been in the cache, acquisition does not occur actually (step 563).

When the display of a page at the transition destination is completed, a script is triggered by the onload of the page or a timer, and invoked. The script acquires a partial tree structure in the same manner as the customer side (step 569). The tree manager 137 decides whether its own tree structure is completed and its own tree structure becomes the same as the received partial tree structure (steps 571 and 573). When both of the tree structures are the same, an affirmative response (Ack of the tree structure) in which the tree structures are synchronized is transmitted to the customer via the HTTP bridge 111 and the session manager 117, and finishes a loading state (step 575). Upon receipt of the affirmative response, the customer who has started loading finishes its loading state. If the synchronization has already started, the tree structure can be sent to the other party as processing is started from step 541.

E. Others

The present invention was described using the examples which are applied to the collaboration between the customer and the agent in the customer support center. The present invention covers technologies applicable to synchronization such as one-to-many or many-to-many electronic conferences or the like. Such technologies are achieved by the following modifications: the session management table and the cache management table are expanded so that they can manage a plurality of participants in the session, and the session manager is expanded to have a function to list generating function of the existing session, a function to participate in the existing session, and a function to leave the existing session. Furthermore, the applet A is modified to have new functionalities to display a list of the existing session and give an instruction to participate in the session and leave the session. In addition to those enhancements, a logic for deciding which party is given priority when the client receives trees from a plurality of other parties is added.

As described above, according to the present invention, the collaboration can be executed on the Internet without introducing collaboration software into the client system.

Although the preferred embodiment of the present invention has been described in detail, it should be understood that various changes, substitutions and alternations can be made therein without departing from the spirit and scope of the invention as defined by the appended claims.

What is claimed:

1. A content information acquisition method for allowing a second information terminal to acquire same information as content information acquired by a first information terminal, comprising the steps of:

(a) interconnecting the first information terminal with a collaboration server for receiving information from a Web server;

(b) interconnecting the second information terminal with said collaboration server for communication;

(c) embedding a client controller into content information, wherein said client controller transmits changed content specifying information to said collaboration server when the first information terminal acquires new content information;

(d) transmitting the changed content specifying information to said collaboration server When the first information terminal acquires the new content information;

(e) causing said collaboration server to transmit the changed content specifying information to the second information terminal; and (f) causing the second information terminal to acquire the changed content specifying information;

wherein said client controller contains (1) a Java applet that detects a change in content information displayed by the customer browser, (2) a script, called by said Java applet, which acquires changed page information including a URL of a first page including the changed content information, a URL of a parent page of said first page, the number of child pages of said parent page, and a position of said first page relative to said parent page, and (3) a tree manager which transmits the changed page information to the collaboration server;

wherein the ability to provide collaboration does not depend on a proprietary interface running on said first information terminal or on said second information terminal.

2. The method of claim 1, wherein said free manager checks whether or not changed page information received from said collaboration server differs from a page that is currently displayed and instructs the customer browser to display said changed page information when said changed page information differs from said page that is currently displayed.

3. A software product for supporting a second information terminal in acquiring the same information as content information acquired by a first information terminal from a Web server, the first information terminal having a first browser installed therein which displays the content information, the software product comprising:

(a) a program code for instructing the collaboration server to embed a client controller which transmits changed contents specifying information to the collaboration server, when the first information terminal connected to the collaboration server acquires new content information from the Web server via the collaboration server; and (b) a program code for instructing the collaboration server to transfer the changed contents specifying information transmitted from the first information terminal to the second information terminal;

wherein said client controller contains (1) a Java applet which detects a change in content information displayed by the first terminal, (2) a Script, called by said Java applet, which acquires changed page information including a URL of a first page including the changed content information, a URL of a parent page of said first page, the number of child pages of said parent page, and a position of said first page relative to said parent page, and (3) a tree manager that transmits said changed page information to said collaboration server;

wherein the ability to provide collaboration does not depend on a proprietary interface running on said first information terminal or on said second information terminal.

4. The software product of claim 3, wherein said tree manager further checks whether or not changed page information transmitted from said collaboration server corresponds to a page that is currently displayed by the customer browser and instructs the customer browser to display a page corresponding to the changed page information when said changed page information and said page currently displayed differ.

5. A collaboration system which supports a second information terminal in acquiring the same information as content information acquired from a Web server by a first information terminal having a first browser installed therein which displays the content information, comprising:

a server configured to provide a connection to the first browser and to a second browser on the second information terminal and to provide web access to said first browser and to said second browser, said server including (a) a cache manager for embedding a client controller into content information acquired from the web, said client controller configured to provide changed contents specifying information to said collaboration server, when the first browser acquires new content information; and (b) a session manager for transmitting the changed contents specifying information from the first browser to the second browser in response to detection of a change in the content information being displayed by the first browser, wherein said client controller consists of (1) a Java applet which detects a change in content information displayed by the customer browser, (2) a script, called by said Java applet, which acquires said changed contents specifying information including a URL of a first page including the changed content information, a URL of a parent page of said first page, the number of child pages of said parent page, and a position of said first page relative to said parent page, and (3) a tree manager which transmits said changed contents specifying information to the collaboration server;

wherein the ability to provide collaboration does not depend on a proprietary interface running on said first information terminal or on said second information terminal.

6. The collaboration system of claim 5, wherein said tree manager checks whether or not changed page information received from said server differs from a page that is currently displayed and instructs the browser to display said changed page information when said changed page information differs from said page that is currently displayed.

* * * * *

UNITED STATES PATENT AND TRADEMARK OFFICE
CERTIFICATE OF CORRECTION

PATENT NO. : 6,912,573 B2
DATED : June 28, 2005
INVENTOR(S) : Ohkado et al.

It is certified that error appears in the above-identified patent and that said Letters Patent is hereby corrected as shown below:

Column 20,
Line 29, delete "When" and insert -- when --.
Line 50, delete "free" ans insert -- tree --.

Column 21,
Line 10, delete "Script" and insert -- script --.

Signed and Sealed this

Twentieth Day of December, 2005

JON W. DUDAS
*Director of the United States Patent and Trademark Office*